UNITED STATES PATENT OFFICE.

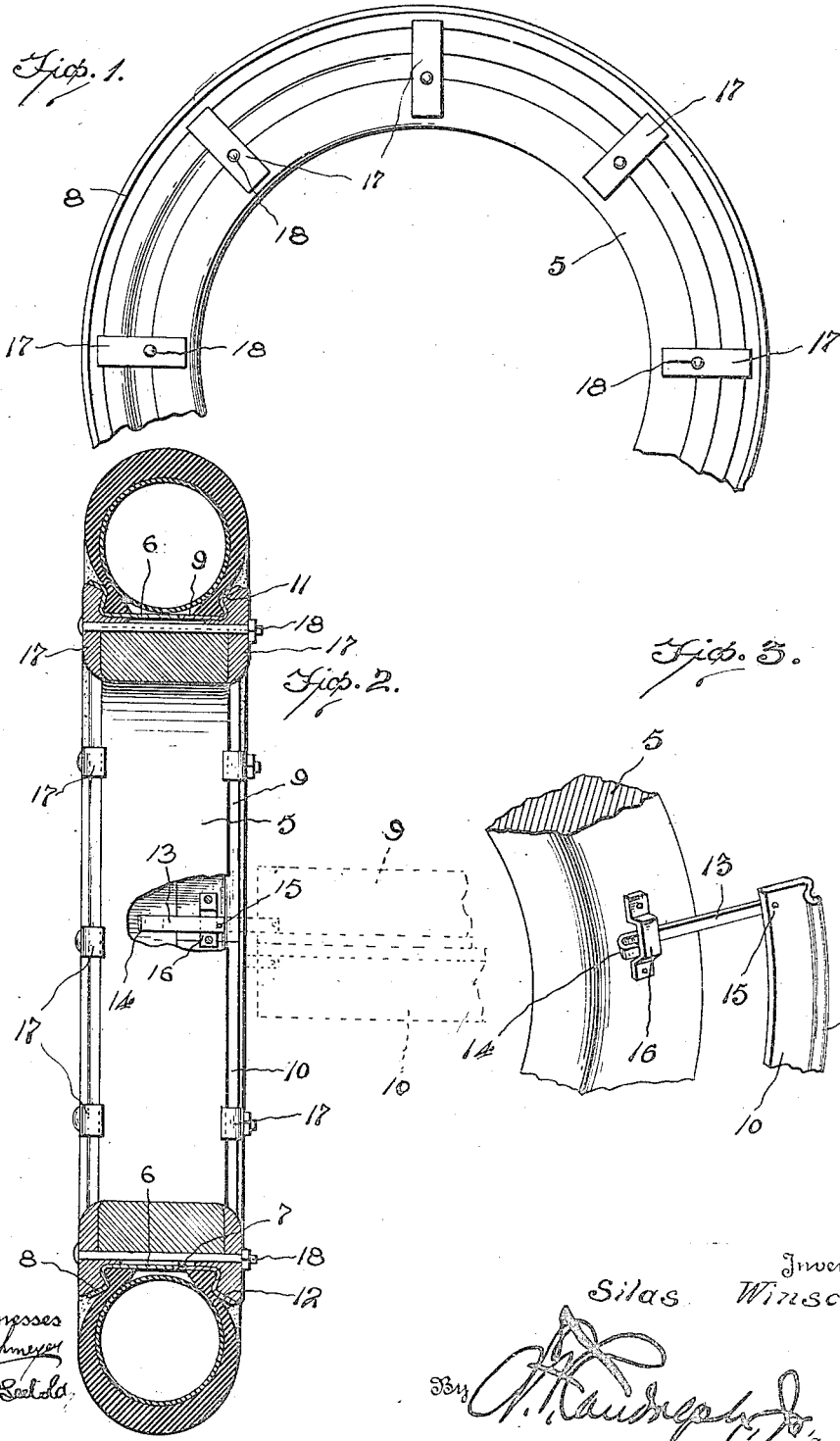

SILAS WINSCOTT, OF STURGEON, MISSOURI.

VEHICLE-WHEEL RIM.

1,253,325.

Specification of Letters Patent.　　Patented Jan. 15, 1918.

Application filed August 24, 1915.　Serial No. 47,084.

*To all whom it may concern:*

Be it known that I, SILAS WINSCOTT, a citizen of the United States, residing at Sturgeon, in the county of Boone and State of Missouri, have invented certain new and useful Improvements in Vehicle-Wheel Rims; and I do hereby declare the following to be a full, clear, and exact description of the invention, such as will enable others skilled in the art to which it appertains to make and use the same.

This invention relates to wheels and more particularly to a wheel rim especially designed for holding resilient vehicle tires.

The invention has for its primary object to provide a vehicle wheel rim of improved and simplified construction embodying means whereby the tire may be quickly and conveniently positioned on or removed from the rim.

Another object is the provision of a wheel rim including a sectional or two-part tire-engaging and retaining flange, which may be moved laterally of the body of the rim and swung outwardly so as to facilitate removal and replacing of tires upon the wheel.

With these and other objects in view, the invention consists in the novel construction, arrangement and formation of parts as will be hereinafter specifically described, claimed and illustrated in the accompanying drawing, in which:

Figure 1 represents a fragmental side elevation of the improved vehicle wheel rim.

Fig. 2 represents a sectional view therethrough, and

Fig. 3 represents a fragmental detail perspective view, partly broken away, of the wheel felly and one of the relatively movable tire-engaging flanges of the rim.

Referring to the drawing in detail, wherein similar reference numerals designate corresponding parts throughout the several views, the numeral 5 indicates the felly of a wheel of the usual or any preferred construction having the usual spokes (not shown). One part 6 of the tire supporting rim surrounds the felly 5 and is of slightly greater external diameter than the external diameter of the felly providing a space 7. A tire-engaging and retaining flange 8 is formed integral with one longitudinal edge of the rim part 6.

The other relatively narrow rim part is positioned upon the felly 5 laterally of the part 6 and is composed of two semi-circular sections designated by the numerals 9 and 10. The relatively narrow rim sections 9 and 10 are formed with integral angular tire-engaging flanges 11 and 12, respectively, shaped similarly to the flange 8 of the outer and relatively wide one piece rim part 6 and adapted to coöperate therewith in securing a tire.

The shanks 13 of hooks 14 are pivotally connected at 15 adjacent the ends of the two inner rim sections, and are slidably secured to the outer surface of the felly 5 under straps 16, which latter are adapted to be engaged by the hooks 14 to limit the outward movement of the inner rim sections.

A plurality of rim-retaining elements or lugs 17 are secured upon the felly 5 by bolts 18, or equivalent means for removably securing the flanges of the rim parts in operative engagement with a tire.

In use, the slidable and pivotal rim sections 9 and 10 are moved outwardly, with relation to the felly 5, and are swung upon their pivotal axes 15 to the position illustrated in dotted lines in Fig. 2. In this position the tire may be quickly and conveniently placed upon the relatively wide part 6 or removed therefrom, as desired. The sections 9 and 10 of the outer rim part are subsequently positioned as shown in full lines in Fig. 2 and are rigidly secured in operative position by the rim lugs 17 and coöperating bolts 18. If preferred, the part 6 may be removed from the felly 5 to remove or replace the tire, in the same manner as a demountable rim.

What I claim is:

1. In a wheel, a felly, a tire supporting rim arranged on said felly and consisting of a pair of independent portions, each portion having opposed circumferential flanges, means to lock said portions on said felly, one portion consisting of a pair of semi-circular sections, means pivotally carried by the sections for slidably engaging the upper surface of said felly, whereby the sections can be moved laterally of the felly and toward each other.

2. In a wheel, a felly, a tire supporting rim arranged on said felly and consisting of a pair of independent portions, each portion having opposed circumferential flanges, means to lock said portions on said felly, one portion consisting of a pair of semi-circular sections, bars slidably mounted on the upper surface of said felly and connected to the sections, so that the same can be moved laterally of the felly, said sections being pivotally secured to the bars, whereby said sections can be swung toward each other when the same are moved laterally of the felly.

In testimony whereof I affix my signature in presence of two witnesses.

SILAS WINSCOTT.

Witnesses:
M. R. McCASLIN,
W. S. DINWIDDIE.